(12) United States Patent
Zhang

(10) Patent No.: US 7,133,513 B1
(45) Date of Patent: Nov. 7, 2006

(54) METHOD AND SYSTEM FOR TRANSCRIBING VOICE CONTENT OF AN ON-GOING TELECONFERENCE INTO HUMAN-READABLE NOTATION

(75) Inventor: Baoquan Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 217 days.

(21) Appl. No.: 10/895,801

(22) Filed: Jul. 21, 2004

(51) Int. Cl.
*H04M 3/42* (2006.01)

(52) U.S. Cl. .............................. 379/202.02; 379/88.14

(58) Field of Classification Search ..................... None
See application file for complete search history.

(56) References Cited

U.S. PATENT DOCUMENTS 6,850,609 B1 * 2/2005 Schrage ................ 379/202.01
2002/0069069 A1 * 6/2002 Kanevsky et al. .......... 704/271
2004/0102957 A1 5/2004 Levin
2004/0249884 A1 * 12/2004 Caspi et al. ................ 709/204
2005/0010407 A1 * 1/2005 Jaroker ....................... 704/235
2005/0053214 A1 * 3/2005 Reding et al. ......... 379/202.01

* cited by examiner

*Primary Examiner*—Creighton Smith (57) ABSTRACT

A method and system for providing transcribed voice content in a human-readable format during an on-going teleconference is provided. In the method, a first terminal engages in an on-going teleconference with a second terminal. During the on-going teleconference, the second terminal is operable to communicate voice content. Sometime during the on-going teleconference, the first terminal may invoke a transcription service for transcribing the voice content into a human-readable notation. After being invoked, the transcription service transcribes the voice content into the human-readable notation and forwards it to the first terminal. After receiving the human-readable notation, the first terminal is operable to display the human-readable notation.

21 Claims, 8 Drawing Sheets

METHOD AND SYSTEM FOR TRANSCRIBING VOICE CONTENT OF AN ON-GOING TELECONFERENCE INTO HUMAN-READABLE NOTATION

BACKGROUND

1. Field

The present invention relates to communications and, more particularly, to a method and system for transcribing voice content of an on-going teleconference into human-readable notation.

2. Description of Related Art

A conference call or teleconference allows two or more parties from remote locations to participate in a telephone conversation via their subscriber terminals (e.g., their desktop telephones, mobile telephones, computers or handheld computing devices). Accordingly, a teleconference enables the parties to meet without being in face-to-face contact. And for the most part, the cost associated with holding and participating in the teleconference is generally much less than the cost associated with gathering the parties in one location to hold face-to-face meetings, especially as the number of parties increase.

Businesses, as represented by their business people, use teleconferences to communicate and/or discuss a myriad of information for countless purposes. For example, businesses may hold teleconferences with a various number of parties for the purposes of carrying out business matters, reporting their financial status, relaying information to their employees, providing information to their customers and suppliers, and the like. The number of the parties participating in these teleconferences is generally commensurate with the purpose and/or topic of the teleconference.

For example, the number of parties to the teleconference may be quite substantial when reporting the financial status of a business. On the other hand, the number of parties to the teleconference may be only a few when the topic of discussion relates to some aspect of running the day-to-day business.

To carry out a teleconference, the parties first initiate or establish a teleconference, and then carry on a conversation as if carrying on a normal telephone call between two people. When the parties are finished, they hang up as if ending the normal telephone call.

Establishing a teleconference may be carried out in a number of ways. For example, a teleconference may be established by adding a third party to an on-going telephone conversation between a first and a second party. This may be carried out by the first party (i) placing the second party on hold, (ii) calling the third party on a second line, and (iii) then bridging the second and third parties by releasing the second party from hold.

Alternatively, a teleconference may be established by having parties with invitations to the teleconference dial into and connect a conference server using information contained within the invitations. In such case, each party connected to the conference server receives from the conference server voice content provided by any other party. After establishing the teleconference, the parties participate in the now on-going teleconference by speaking voice content into a microphone and/or listening to spoken voice content via a speaker.

In some instances, not all of the parties to the teleconference will have equal rights in participating in the on-going conversation. For example, some of the parties may not be allowed to speak voice content, i.e., the voice content may not be forwarded to the conference participants. Instead, they may be relegated to merely listening the conversation.

Such limitations may depend upon the information being exchanged or the purpose for the teleconference. For example, a teleconference held by a business for communicating information to employees may not allow the employees to interject in the conversation, whereas a teleconference between members of a particular business unit discussing a particular business matter may have equal access in interacting with the other members.

If, after establishing the teleconference, a user of the first subscriber terminal desires to place an outbound call, receive an incoming call, mute the conversation, and/or otherwise suspend the on-going teleconference, then that user may first place the teleconference on hold. To place the teleconference on hold, the user of the first subscriber terminal may depress on the first subscriber terminal a key or sequence of keys on, such as the hold key or a sequence of numbered digits, respectively.

This, in turn, causes the first subscriber terminal to issue a service-event signal, such as a dual-tone multifrequency signal, to the other subscriber terminals, the conference server or other network node between the first subscriber terminal and the conference server. The service-event signal allows causes the first subscriber terminal, other subscriber terminals, the conference server, and/or the network node to place the first subscriber terminal hold, but not let it be dropped from the teleconference.

When desiring to rejoin the teleconference, the user of the first subscriber terminal may again depress a key (e.g., the hold key) on the first subscriber terminal. As before, this causes the first subscriber terminal to issue another service-event signal to the other subscriber terminals or the conference server. Responsive to this second service-event signal, the first subscriber terminal, other subscriber terminals, the conference server, and/or network node releases the first subscriber terminal from hold.

When on hold, the voice content of the on-going teleconference is not transmitted to the user of the first subscriber terminal. As such, the user is free to do other activities, such as having a face-to-face conversation with a person, placing the outbound call and/or receiving the incoming call, without interference from the conversation of the on-going teleconference.

Unfortunately, this presents a conundrum for the user of the first subscriber terminal who may desire to be apprised of the substance of the teleconference while the teleconference is suspended. This is because the user must decide to either participate in the on-going teleconference or the other activities, but not both.

Therefore, the inventors have discovered a need for a system and method that allows the user of a subscriber terminal to be apprised of the substance of an on-going teleconference whenever the teleconference is placed on hold or otherwise suspended. Further, the inventors have discovered a need for a system and method that allows the user of a subscriber terminal to be apprised of the substance of an on-going teleconference while being able to carry out a second communication.

SUMMARY

In accordance with one aspect of the invention, a method and system for providing transcribed voice content in a human-readable format during an on-going teleconference is provided. In the method, a first terminal, such as a Private Branch Exchange (PBX) extension terminal, may engage in an on-going teleconference with a second terminal, such as mobile phone, which is located remotely from the PBX extension terminal. During the on-going teleconference, the mobile phone is operable to communicate voice content. Sometime during the on-going teleconference, the PBX extension terminal may invoke a transcription service for transcribing the voice content from the mobile phone into a human-readable notation, such as text, sign language, images, special characters, etc. After being invoked, the transcription service transcribes the voice content into the human-readable notation and forwards it to the PBX extension terminal. After receiving the human-readable notation from the transcription service, the PBX extension terminal is operable to display the human-readable notation.

BRIEF DESCRIPTION OF THE DRAWINGS

Preferred embodiments of the present invention are described with reference to the following figures, wherein like reference numerals refer to like elements in the various figures, and wherein.

DETAILED DESCRIPTION

Exemplary Architecture

Figure 1:
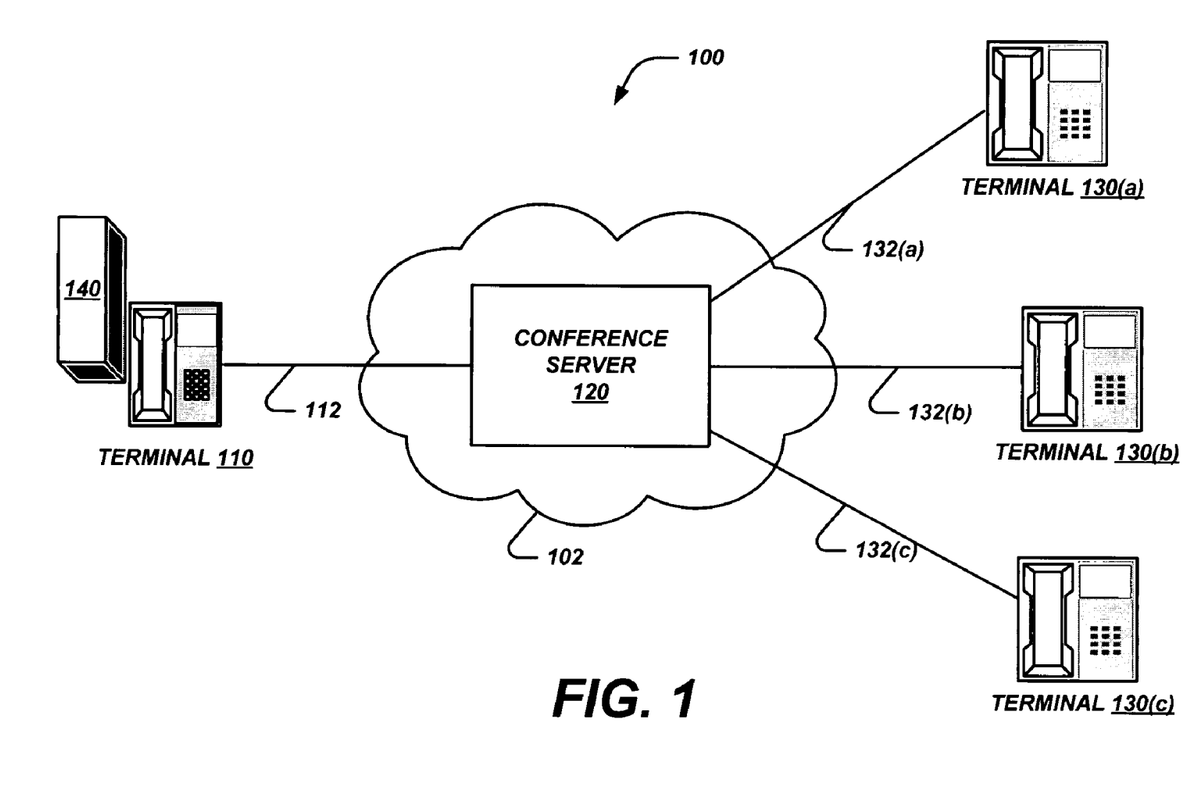
FIG. 1 is a first block diagram of a first system for serving a transcription service to a first subscriber terminal engaged in an on-going teleconference with other subscriber terminals.

FIG. 1 is a block diagram of a system 100 for serving a transcription service to a first subscriber terminal (FST) 110 engaged in an on-going teleconference with other subscriber terminals, such as subscriber terminals 130(a–c) (hereinafter collectively referred to as "member terminals"). When invoked, the transcription service transcribes voice content communicated during the on-going teleconference into a human-readable notation, such as text, sign language, images, special characters including those from smiley and gesture dictionaries, etc A conference server 120 within a network 102 provides teleconferencing services so as to allow the FST 110 and the member terminals 130(a–c) to participate in a teleconference. The system 100 may also be deployed with other network elements not depicted in FIG. 1, such as switching devices, routing devices and service servers for serving services to the FST 110 and the member terminals 130(a–c).

The network 102, like the system 100 as a whole, may be a partial or full deployment of most any communication or computer network, and thus, can include a few or many network elements, most of which are not depicted in FIG. 1 for simplicity. For instance, the network 102 may be deployed with network elements, such as switching devices, routing devices and service servers for serving services to the FST 110 and the member terminals 130(a–c).

The network 102 may also include serving or access systems through which the FST 110 and member terminals 130(a–c) communicatively couple to the network 102, and in turn, the conference server 120. Such coupling may be made, for example, by communication channels 112, 132 (a–c), which communicatively couple the FST 110 and the member terminals 130(a–c) to the to the conference server 120, respectively. The access systems, like the network 102 may be a partial or full deployment of most any communication or computer network and can include a few or many network elements.

Thus, the access systems and the network 102 may include elements of any public or private terrestrial wireless or satellite, and/or wire-line networks. Details of preferred public and private networks may be found in co-pending U.S. patent application Ser. No. 10/748,599, filed on Dec. 29, 2003, and entitled "Roaming-Agreement Application and Database for Roaming between Public and Private Wireless Networks," the entirety of which is fully incorporated herein by reference.

The access systems and network 102 may also include various internal interconnected network elements to provide one or more segments of the communication path between the FST 110, the conference server 102, and the member terminals 130(a–c). In practice, these elements include elements of Public Switched Telephone Networks, such as the hardware and services provided by local exchange carriers (LECs) and interexchange carriers (IXCs). The elements may also include elements of private wire-line networks, such as enterprise Private Branch Exchange; and/or public and private wireless networks, such as a Sprint PCS® network, a wireless wide area network, and/or a wireless local area network (WLAN). The WLAN may be embodied as a wireless local area network that operates in the radio frequency spectrum set aside for license-free, Industrial, Scientific and Medical (ISM) frequency bands.

Communications traversing the communication channels 112 and 132(a–c) may be carried out according to any public and/or proprietary format and/or protocol. For example, the communications traversing communication channels in public and/or private networks may be carried out using the well-known Advanced Intelligent Network (AIN)/Signaling System 7 (SS7), other plain old telephone service (POTS) protocols, Ethernet specification, and/or IEEE 802 standard.

Additionally, communications traversing wireless portions of the communication channels 112, 132(a–c), such as a wireless medium between the FST 110 and its access systems (not shown) and/or between the member terminals 130(a–c) and their respective access systems (not shown) may be may be carried out using formats and protocols for any commonly used public wireless interface formats. Such wireless interface may include, for example, Advanced Mobile Phone Service (AMPS), Time Division Multiple Access (TDMA), Global System for Mobile Communications (GSM), and Code Division Multiple Access (CDMA), Universal Mobile Telecommunications Service ("UMTS"), Wide-band CDMA ("WCDMA"), CDMA2000, and Generic Packet Radio Services ("GPRS").

Alternatively, the wireless portions of the communication channel may be carried out according to private-network formats and protocols. These private-network formats and protocols may be, for example, the Ethernet (IEEE 802.3) specification, the Telecommunications Industry Association (TIA/EIA) IS-94 Recommendation entitled "Mobile Station—Land Station Compatibility Specification for Analog Cellular Auxiliary Personal Communications Services" ("IS-94"), the Bluetooth specification, the IEEE 802.11 standard, the IEEE 802.16 standard, and/or other wireless local area network specification, in addition to the formats and/or protocols of the public wireless and/or wire-line networks.

Thus, the communication channels 112, 132(a–c) may be configured to facilitate circuit-switched and/or packet-data protocols. As such, the FST 100 and the member terminals 130(a–c) may include logic (i.e., hardware, software, firmware, and/or some combination thereof) to send and receive data and voice content using circuit-switched and/or packet-data elements and protocols.

As depicted in FIG. 1, the FST 100 and the member terminals 130(a–c) are desktop telephones. The FST 110 and the member terminals 130(a–c), however, may be devices other than desktop phones. For instance, each of the FST 110 and the member terminals 130(a–c) may be any device that (i) can engage in a teleconference via the conference server 120, and (ii) has one or more displays any one of which can display human-readable notation, such as text, sign-language, images, special characters including those from smilely and gesture dictionaries, etc. By way of non-limiting example, each of the FST 110 and the member terminals 130(a–c) may be a computer, a handheld computing device, a personal digital assistant, a mobile, cordless and/or cellular phone, and the like.

In addition, the FST 110 may include or be coupled to a speech-recognition engine 140 for carrying out the transcription service. Using voice content received on the FST 110, the speech-recognition engine 140 may transcribe the voice content into human-readable notation, and then provide the human-readable notation to the display of the FST 110. This human-readable notation, as noted above, may be text, sign-language, images, special characters, etc.

To facilitate such transcription service, the speech-recognition engine 140 may include one or more logic modules (i.e., hardware, software, and/or firmware) for converting the voice content into the human-readable notation. This logic module may be embodied as a speech-to-text conversion engine, for instance. One such exemplary speech-to-text conversion engine is "Nuance 8.0," which is available from Nuance Communications, Inc., located in Menlo Park, Calif., 94025.

If, however, the human-readable notation is to be in a form other than text, the speech-recognition engine 140 may include other conversion engines in addition to or in lieu of the speech-to-text conversion engine. For instance, the speech-recognition engine 140 may include speech-to-sign language system to transcribe the voice content into sign language. Details of such an exemplary system may be found in co-pending U.S. patent application Ser. No. 10/327, 501, filed Dec. 20, 2003, and entitled "Client/Server Rendering Of Network Transcoded Sign Language Content," the entirety of which is incorporated herein by reference. Additional processing elements for carrying out the transcription service, such as computing platforms, databases, and buffers may be included in the speech-recognition engine 140 as well.

Although the foregoing describes only the FST 100 including a transcription-service element, each of the member terminals 130(a–c) may likewise include a similar speech-recognition engine for transcribing the voice content into a desired human-readable notation. Each of these speech-recognition engines may carry out the transcription service in the same, or conversely, different forms. For instance, the speech-recognition engine of the member terminal 130(a) may include a speech-to-text conversion engine for transcribing voice content into text, while the transcription-service elements of the member terminal 130 (b–c) may include a speech-to-sign-language conversion system and a speech-to-image conversion engine, respectively.

In addition, the speech-recognition engines of the FST 110 and member terminal 130(a–c) may carry out the transcription service using one or more interim steps. For instance, each the speech-recognition engines may first transcribe voice content to text and then into a second format, such as sign language.

Exemplary Operation

Figure 2:
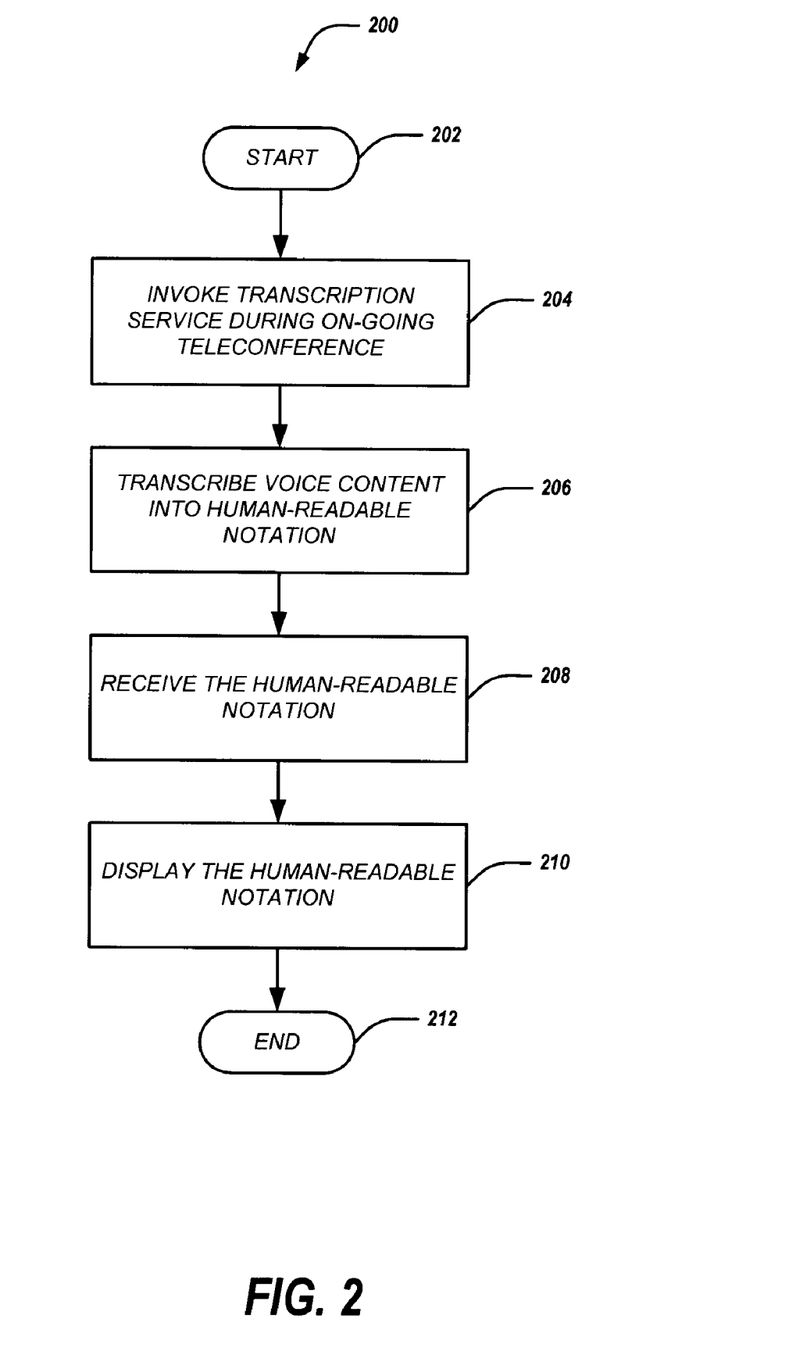
FIG. 2 is a first flow diagram illustrating a first flow for serving a transcription service to a first subscriber terminal that is engaged in an on-going teleconference with other subscriber terminals.

FIG. 2 is a flow chart illustrating a flow 200 for serving a transcription service to a first subscriber terminal that is engaging in an on-going teleconference with other subscriber terminals. The flow 200 is described in reference to the system 100 of FIG. 1. The flow 200, however, may be carried out other systems as well.

The flow 200 starts, as shown in block 202, during an on-going teleconference between the FST 110 and one or more of the member terminals 130(a–c). During this on-going teleconference, one of the member terminals 130 (a–c), namely, member terminal 130(a), communicates voice content. The member terminal 130(a) then transmits the voice content over the communication channel 132(a) for termination to the conference server 120. The conference server 120 receives the voice content from the communication channel and distributes it over communication channels 112, 132(b) and 132(c) to the FST 110 and the member terminals 130(b–c), respectively.

At block 204, the FST 110 invokes the transcription service to cause the speech-recognition engine 140 to execute the transcription service so as to transcribe the voice content received from the conference server 120 into the human-readable notation. The FST 110, however, may invoke the transcription service at any time during the on-going teleconference. For instance, the FST 110 may invoke the transcription service immediately after establishing a connection with the conference server 120 or whenever a user of the FST 110 so desires.

The FST 110 may invoke the transcription service by sending some indication to the speech-recognition engine 140. This indication may be, for example, a dual-tone multifrequency (DTMF) signal representative of a "hold," "mute," and/or other key function on the FST 110. If, for example, the FST 110 is embodied as a computer, then a computer program on the FST 110, when executed, may send a signal via its internal bus to the speech-recognition engine 140 as the indication. Other indications, such as out-of-band signaling or signals representative of user input on the FST 110, may be used as well.

After receipt of the indication, the speech-recognition engine 140 executes the transcription service, which then transcribes any subsequently received voice content into the human-readable notation, as shown in block 206. The transcription service may transcribe the voice content into the human-readable notation in a desired form (e.g., text, sign language, imagery, etc.). This desired form may be dictated by, selected by or correspond to capabilities and/or preferences of the speech-recognition engine 140, the FST 110, and the communication channel 112.

These capabilities and/or preferences may be, for example, the amount of processing power of the speech-recognition engine 140 and the FST 110; the hierarchy of applications running on the FST 110; the available bandwidth of the communication channels 112; the Quality of Service (QoS) available from the network 102 and/or subscribed to by the FST 110, if the network 102 is embodied at least in part as a packet-based network; the Class of Service (CoS) available from the network 102 and/or subscribed to by the FST 110, if the network 102 is embodied at least in part as a circuit switched network; the type of display of the FST 110, such as a Liquid-Crystal Display (LCD), a light-emitting diode (LED) display, a Video Graphics Array (VGA) display, a Super SVGA display, a thin film transistor (TFT) display, etc.; the ability of the FST 110 to display text, images, and/or video; and the like.

In addition, the transcription service may be carried out in a real-time, near-real-time and/or delayed-in-time delivery mode. The delivery mode, however, may also depend on the capabilities and/or preferences of the speech-recognition engine 140, the FST 110 and the communication channel 112. In the real-time delivery mode, the speech-recognition engine 140 transcribes the voice content so as to supply to the FST 110 a substantially continuous stream of human-readable notion that corresponds with a stream of voice content communicated by the conference server 120. This delivery mode may depend upon the QoS or CoS available from the network 102 and/or subscribed to by the FST 110, for instance.

In the near-real-time delivery mode, the speech-recognition engine 140 transcribes the voice content from the member terminal 130(a) so as to supply to the FST 110 a stream of human-readable notion that closely approaches real time, but may be buffered slightly. Accordingly, storage buffers may be used by speech-recognition engine 140 for (i) holding voice content destined for the transcription service and (ii) holding transcribed voice content outputted from the transcription service. When the transcription service is not carried out in real-time or near-real-time delivery modes, the speech-recognition engine 140 is operating in the delayed-in-time mode. In this mode, like the near real-time mode, storage buffers may be used to carry out the transcription service.

To determine the delivery mode in which to carry out the transcription service, the speech-recognition engine 140 may have to know the capabilities and preferences of the FST 110. Accordingly, the speech-recognition engine 140 may request or have reported to it the capabilities and preferences of the FST 110. This may be carried out using a proprietary or standard reporting protocol.

Alternatively, a user or a provider of the transcription service (man or machine) may specify the capabilities and/or preferences of the FST 110. The user or the provider of the transcription service, for example, may specify the capabilities and/or preferences of the FST 110 at an initiation of the transcription service and/or during periodic updates. Other methods and systems may be used for reporting the capabilities and/or preferences of the FST 110.

The speech-recognition engine 140, using a proprietary or standard reporting protocol, may also request or have reported to it the capabilities of the communication channel 112. Such proprietary or standard reporting protocol may be based in whole or in-part on the well known AIN and SS7 standards, the Realtime Transport Protocol, the Reservation Protocol, the Common Open Policy Service, Routing Information Protocol, Service Advertising Protocol, and the like.

In addition, the capabilities and/or preferences of the FST 110 and the communication channel 112 may be stored in a data-storage repository (not shown) resident on the FST 110 or in a network element. When needed, the speech-recognition engine 140 may obtain the capabilities and/or preferences of the FST 110 and/or the communication channel 112 from the data-storage repository before transmitting the human-readable notation to the FST 110.

Alternatively, the speech-recognition engine 140 may be preprogrammed to carry out the transcription service in a format that corresponds to capabilities and/or preferences of the FST 110, thereby eliminating discovery of the capability and/or preferences of the FST 110. The speech-recognition engine 140, however, may still have to discover the capabilities of the communication channel 112 to determine if the communication channel 112 and the conference server 120 can supply the voice content at a rate to support the delivery mode. For instance, the speech-recognition engine 140 may have to determine if the conference server 120 and the communication channels 112 are capable of supplying the voice content at an appropriate CoS or QoS to enable the transcription service transcribe the voice content to text in the real-time delivery mode.

At block 208, the FST 110 receives the human-readable notation from the speech-recognition engine 140, which, as noted, may be received in the desired form and the delivery mode appropriate for the FST 110. Sometime thereafter, at block 210, the FST 110 may display to the human-readable notation on its display in the desired form.

If for example, the FST 110 is embodied as a desktop telephone having a two-line LCD or LED display, then the human-readable notation may be delivered to the FST 110, and in turn to its display, in a text or character form formatted for the two-line LCD or LED display. If, however, the FST 110 is embodied as a computer terminal that has a resident application for displaying sign language, then the human-readable notation may be delivered to the FST 110, and in turn to its display, in a sign language form. As can be readily discerned, the human-readable notation may be delivered to the FST 110, and in turn to its display, in any form in which the FST and its display are capable of displaying.

Alternative Architectures and Corresponding Operations

Figure 3:
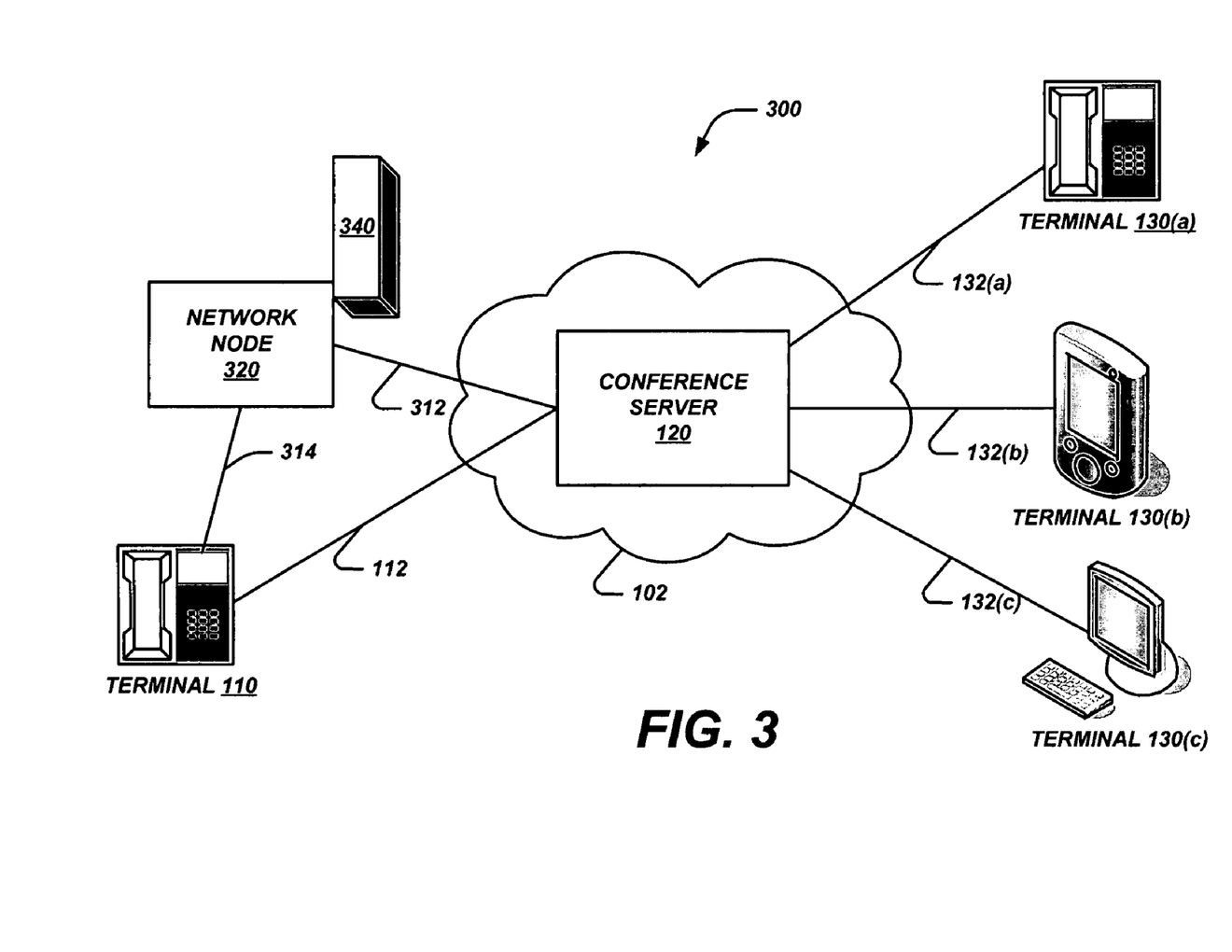
FIG. 3 is a second block diagram of a second system for serving a transcription service to one subscriber terminal engaging in an on-going teleconference with other subscriber terminals.

FIG. 3 is a block diagram of a system 300 for serving a transcription service to one subscriber terminal engaging in an on-going teleconference with other subscriber terminals. The system 300 of FIG. 3 is similar to the system 100 of FIG. 1, except as described herein. In addition to the FST 110 and the member terminals 130(a–c), which are embodied as a desktop phone, a handheld device and a computer, respectively, a network node 320 is communicatively coupled to the conference server 120 via communication channel 312.

The network node 320 may be contained within or coupled to the network 102. Communications traversing the communication channel 312 may be carried out according to any formats and/or protocols noted above, and one or more proprietary formats of protocols.

The network node 320 may include one or more computing platforms for providing a host of individual services, such as proxy/registration services, application services, media services, web services, and the like. Included among the application services is the aforementioned transcription service, which may be carried out by a speech-recognition engine 340. The speech-recognition engine 340 may be distributed among or concentrated on one of the computing platforms of the network node 32.

Each of the computing platforms may include software or firmware operating on a processing system, such as a general purpose computing system, a specialized computing system, an open source, e.g., a Linux, computing system, a proprietary computing system, and the like. And each of processing systems may be configured for distributed or concentrated processing, and may be arranged in a peer-to-peer format, a client-server format or some combination thereof.

Although the network node 320 is shown separate from the conference server 120, the network node 320 may be part of the conference server 120 or vice versa. Thus, the speech-recognition engine 340 may be included in the conference server 120.

In addition, the conference server 120 may act as a proxy for the speech-recognition engine 340. This allows the FST 110 and the member terminals 130(a–c) to address the speech-recognition engine 240 without knowingly addressing the conference server 120, and vice versa.

The FST 110 may also engage in the on-going teleconference via the network node 320. In such case, (i) the FST 110 and the network node 320 may communicate over communication channel 314, and (ii) the network node 320 and conference server 120 may communicate over the communication channel 312. Communications traversing the communication channels 312, 314 may be carried out according to any formats and/or protocols noted above. These communication channels 312, 314 may also be configured to carry data or bearer content along with the voice content. Moreover, the FST 110 and the member terminals 130(a–c) may communicatively couple to the speech-recognition engine 340 via dedicated communication channels (not shown) or via virtual tunnels, such as those provided by virtual private networks (VPNs). Furthermore, the communication channel 314 may be an element of the network 102 given that network node 320 may likewise be an element of the network 102.

Figure 4:
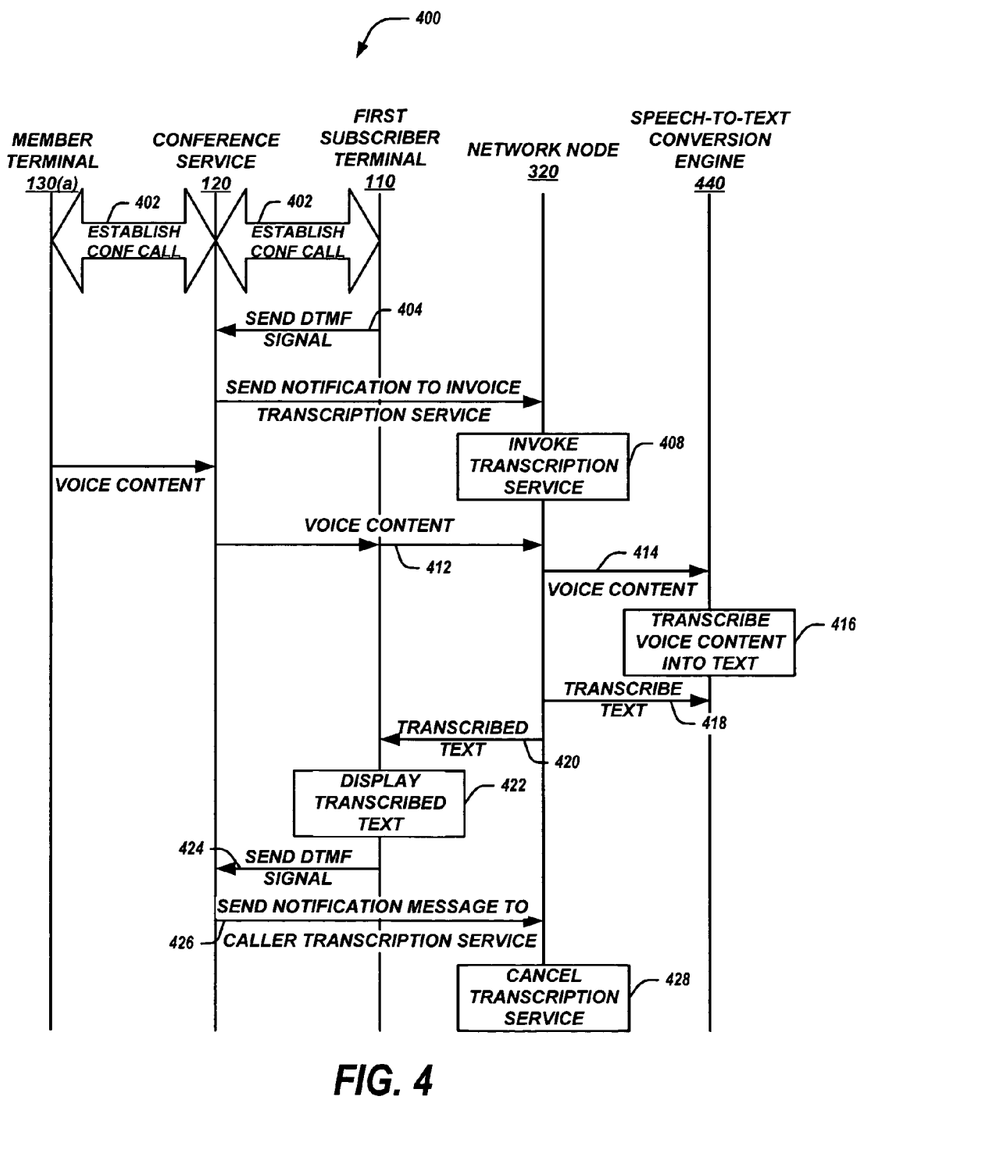
FIG. 4 is a call-flow diagram illustrating a call flow for serving transcription services to a first subscriber terminal engaging in an on-going teleconference with other subscriber terminals.

Referring now to FIG. 4, a flow chart illustrating a call flow 400 for serving transcription services to a first subscriber terminal engaging in an on-going teleconference with other subscriber terminals is shown. The call flow 400 is described in reference to the system 300 of FIG. 3. In this embodiment, however, the speech-recognition engine 340 may be embodied as a speech-to-text conversion engine 440, and the transcription service may be embodied as a speech-to-text conversion service. The call flow 400 may also be carried out other systems, such as the system 100.

At call flow element 402, the FST 110 and the member terminal 130(a) establish a teleconference. The FST 110 and the member terminal 130(a) may establish the teleconference by dialing in to conference server 120 and providing authentication information, e.g., a previously authorized passcode, to authenticate their authorization to join in the teleconference. Once authenticated, the FST 110 and the member terminal 130(a) may communicate to each other voice content.

However, upon entry into the on-going teleconference, the FST 110 invokes the speech-to-text conversion service by sending to the conference server 120 a DTMF signal 404 that is representative of a "hold," "mute," and/or other key function on the FST 110. Instead of a DTMF signal, the FST 110 may invoke the speech-to-text conversion service using other signals or signaling, such as signals responsive to user-selected input on the FST 110 and/or out-of-band signaling.

The conference server 120, either as a proxy for the network node 320, and in turn, for the speech-to-text conversion engine 440 (or as a conduit for these entities), responsively sends a notification message to the network node 320 so to cause the speech-to-text conversion engine 440 to execute the speech-to-text conversion service. The notification message may be formatted according to a standardized or proprietary, circuit-switched or packet-based message schema.

After receipt of the notification message, the network node 320 causes the speech-to-text conversion engine 440 to execute a speech-to-text conversion service, as shown by call flow element 408. This causes the speech-to-text conversion service to transcribe into text any voice content subsequently received by the conference server 120.

The speech-to-text conversion service may be carried out in a real-time, near-real-time and/or delayed-in-time delivery mode. The delivery mode, however, may also depend on the capabilities and/or preferences of the speech-to-text conversion engine 440, the FST 110 and the communication channels 212, 112.

In the real-time delivery mode, the speech-to-text conversion engine 440 transcribes the voice content so as to supply to the FST 110 with a substantially continuous stream of text that corresponds with a stream of voice content communicated by the member terminal 130(a). This delivery mode may depend upon the QoS or CoS available from the network 102 (e.g., the communication channels 312, 112, the conference server 120, and the network node 320) and/or subscribed to by the FST 110.

In the near-real-time delivery mode, the speech-to-text conversion service transcribes the voice content so as to supply to the FST 110 a stream of text that closely approaches the real time mode, but may be buffered slightly. Accordingly, storage buffers may be used by speech-to-text conversion engine 440 for (i) holding voice content destined for the speech-to-text conversion engine 440 and (ii) holding transcribed voice outputted from the speech-to-text conversion engine 440.

When the speech-to-text conversion service need not be carried out in the real-time or near-real-time delivery modes, the speech-to-text conversion engine 440 operates in the delayed-in-time mode. In this mode, like the near real-time mode, storage buffers may be used to carry out the speech-to-text conversion service.

To determine the delivery mode in which to carry out the speech-to-text conversion service, the speech-to-text conversion engine 440 (or other portion of the network node 320) may have to know the capabilities and preferences of the FST 110. The capabilities and preferences of the FST 110 may be requested by or reported to the speech-to-text conversion engine 440 using a proprietary or standard reporting protocol.

If, for example, the FST 110 is engaging in the teleconference over wireless interface or packet-based network, then the reporting protocol may be according to the Composite Capabilities/Preferences Profiles ("CC/PP") Recommendation from the World Wide Web Consortium ("W3C"). The CC/PP was last published by the W3C as a Recommendation on 15 Jan. 2004, and is available only on the Internet at www.w3.org.

Alternatively, a user or a provider of the transcription service (man or machine) may specify the capabilities and/or preferences of the FST 110. The user or the provider of the transcription services, for example, may specify the capabilities and/or preferences of the FST 110 at an initiation of services and/or during periodic updates. These capabilities and/or preferences may then be downloaded and stored in a data-storage repository (not shown) residing the network 120. The speech-to-text conversion engine 440 may obtain the capabilities and/or preferences of the FST 110 from the data-storage repository before transmitting the text to the FST 110. Other methods and systems may be used for reporting the capabilities and/or preferences of the FST 110.

The capabilities of the communication channels 312, 112 may also be requested by or reported to the speech-to-text conversion engine 440 using a proprietary or standard reporting protocol, such as the well known the AIN and SS7 standards, the Realtime Transport Protocol, the Reservation Protocol, the Common Open Policy Service, Routing Information Protocol, Service Advertising Protocol, and the like. These capabilities and/or preferences may be likewise downloaded and stored in the data storage repository fore later retrieval by the speech-to-text conversion engine 440.

After determining the capabilities and/or preferences of the FST 110 and the communication channels 213, 112, the speech-to-text conversion engine 440 receives voice content that was originated by the member terminal 130(*a*), as shown by call flow elements 410, 412, and 414. As shown, the voice content traverses through the conference server 120 and network node 320 on its way to the speech-to-text conversion engine 440.

Upon receipt of the voice content, the speech-to-text conversion service transcribes the voice content into text, as shown by call flow element 416. The transcribed text is then sent to the network node 320 for transmission to the FST 110 in the appropriate delivery mode, e.g., real-time delivery mode.

The FST 110 receives the human-readable notation from the speech-to-text conversion engine 440, as shown by call flow element 420. Sometime thereafter, the FST 110 may display to the text on its display, as shown in call flow element 422. When the FST 110 is embodied as a desktop telephone having a two-line LCD or LED display, for example, then the text may be delivered to the FST 110, and in turn to its display. The text may be delivered in a text or character form that is formatted for the two-line LCD or LED display.

In an alternative embodiment, the FST 110 may be embodied as a computer that has a resident application, for example, a word processing program, which may be used to display and record the transcribed text. After receiving the transcribed text, the FST 110 may execute then the resident application so as to display the transcribed text and make it available for storage.

At some point, the FST 110 may no longer want to receive the transcribed text from the speech-to-text conversion service. To facilitate this, the hold, mute or other key function of the FST 110 may be pressed a second time so as to cause the FST 110 to issue to the conference server 120 a second DTMF signal 424. Responsive to this signal, the conference server sends to the network node 320 a second notification message to cancel the speech-to-text conversion service.

Responsive to the notification message, the network node may cancel the speech-to-text conversion service. Upon termination of the speech-to-text conversion service, voice content is not sent to the speech-to-text conversion engine 440. The speech-to-text conversion service, however, may be reactivated at a later time by repeating the call flow 400.

The foregoing describes the transcription service being carried out by system 300 of FIG. 3. The transcription service may also be carried out in system 100 as noted above. In such an embodiment, the speech-recognition engine 140, which resides on the FST 110, may be preprogrammed to carry out the transcription service in a format that corresponds to capabilities and/or preferences of the FST 110, thereby eliminating discovery of the capability and/or preferences of the FST 110.

The speech-recognition engine 140, however, may have to discover the capabilities of the communication channel 112 to determine if the communication channel 112 and the conference server 120 can supply the voice content at a rate to support the delivery mode. For instance, the speech-recognition engine 140 may have to determine if the conference server 120 and the communication channels 112 are capable of supplying the voice content at an appropriate CoS or QoS to enable the transcription service transcribe the voice content to text in the real-time delivery mode.

Figure 5:
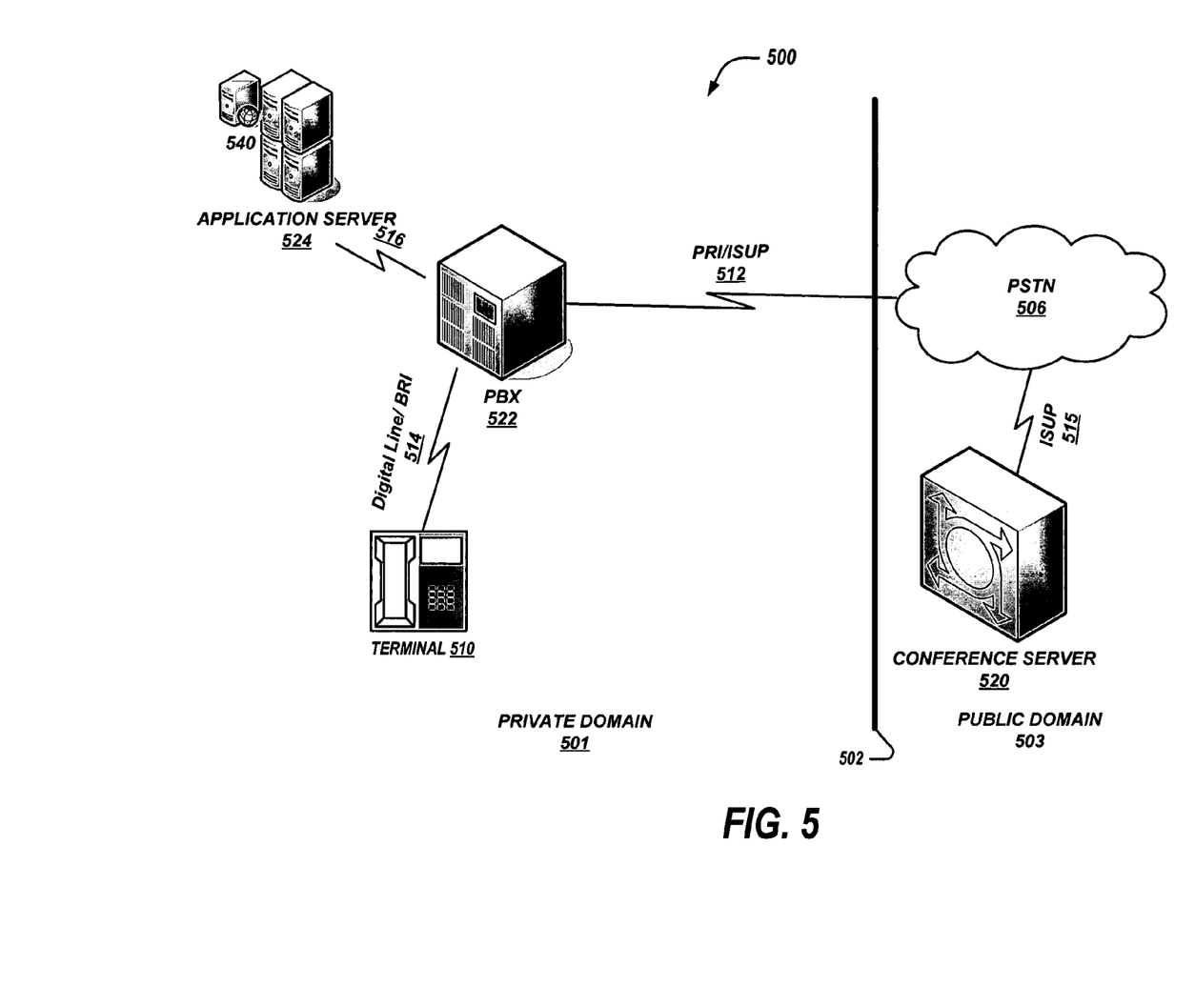
FIG. 5 is a third block diagram illustrating a first telecommunication system for serving a transcription service that transcribes voice content of an on-going teleconference into human-readable notation.

FIG. 5 is a block diagram illustrating a telecommunication system 500 for serving a transcription service in which the transcription service transcribes into human-readable notation voice content of an on-going teleconference between one subscriber terminal and another subscriber terminal. Included in the system 500 are private and public domains 501, 503, respectively. A line 502 serves as an artificial line of demarcation between the public domain and the private domain in the system 500.

This line 502 is intended to illustrate an extent of control, customization, and responsibility of network elements and services by providers of the private and public domains. Details regarding the extent of control, customization, and responsibility of network elements and services by providers of the private and public domains may be found in co-pending application U.S. patent application Ser. No. 10/161,497, filed Jun. 3, 2003, and entitled "Method and System for Diverting Wireless Network Communications," the entirety of which is incorporated herein by reference.

Each of the private and public domains of the system 500 may include various internal interconnected network elements for carrying out the transcription service. When combined, the various internal interconnected network elements provide one or more segments of (i) a first communication path between a subscriber terminal (ST) 510 and a conference server 520, and (ii) a second communication path between a Private Branch Exchange (PBX) 522 and an application server 524.

In practice, the interconnected elements of the public domain may include elements of a Public Switched Telephone Network (PSTN) 506, such as the hardware and services provided by local exchange carriers (LECs) and interexchange carriers (IXCs). The interconnected elements of the public domain may also include elements of one or more public wireless networks, such as a Sprint PCS network (not shown).

In the private domain, the interconnected elements may include elements of private wire-line and wireless networks. For example, the private domain may include the PBX 522, elements of a wireless wide area network (not shown), and/or a wireless local area network (WLAN), including a WLAN that operates in the radio frequency spectrum set aside for license-free, Industrial, Scientific and Medical (ISM) frequency band (not shown).

The private and public domains of system 500, however, may be deployed with other network elements not depicted in FIG. 5 for the sake of simplicity. Such other network elements may include switching devices, routing devices and service servers for serving services to the ST 510 and other terminals (not shown).

The ST 510, like the FST 110 described above, may be a desktop telephone, a computer, a handheld computing device, a personal digital assistant, a mobile, cordless and/or cellular phone, or any device that (i) can engage in a teleconference via the conference server 520, and (ii) has one or more displays any one of which can display human-readable notation, such as text, sign-language, images, special characters, etc. The ST 510 may be configured to communicate voice content, data and/or bearer content over analog or digital circuit-switched and/or packet-based networks.

For instance, the ST 510 may include an Integrated Services Digital Network (ISDN) standard interface for exchanging voice and/or bearer content with the PBX 522 over a first communication channel 514. The first communication channel 514 is typically formatted according to the well-known ISDN standard and its basic rate interface (BRI) service. However, voice content exchanged over the third communication channel 514 may be formatted using other known protocols and standards.

While shown in FIG. 5 as one device, the ST 510 may be more than one device. For instance, the ST 510 may be deployed as two devices; one for communicating the voice content of the on-going teleconference, and one for receiving human-readable notation that is transcribed from such voice content. In another embodiment, the ST 510 may be deployed again as two devices. In this embodiment, however, only one of the devices may be used for carrying on the on-going teleconference (e.g. a desktop phone), while both of the devices (e.g., the desktop phone and a computer) may receive the human-readable notation over the first communication channel 514.

In addition to the first communication channel 514, the first communication path may include a number of other communication channels for establishing and carrying on the on-going teleconference. In the public domain, for example, the conference server 520 may communicatively couple with the PSTN 506 via a second communication channel 515. The voice content exchanged over the second communication channel 515 is typically formatted according to the well-known ISDN User Part (ISUP) of the SS7. However, the voice content exchanged over the first communication channel 515 may be formatted using other known protocols and standards as well.

A third communication channel 512, which crosses the private and public domains, may communicatively couple the PSTN 506 with the PBX 522 to complete the first communication path. The voice content carried over the third communication channel 512 may be formatted according to the well known ISDN Primary Rate Interface (PRI) and/or ISUP. Like above, the voice content exchanged over the third communication channel 512 may be formatted using other known protocols and standards.

In addition to the first communication path, the system includes a second communication path, which couples the application server 524 with the PBX 522. This second path may include a fourth communication channel 516 over which (i) voice content is sent form the PBX 522 to a speech-recognition engine 540 residing on the application server 524, and (ii) transcribed voice content is sent to the PBX 522 from the speech-recognition engine 540. The fourth communication channel may be formatted according to a proprietary or standardized communication protocol, including any formats and/or protocols noted above.

The application server 524 may include one or more computing platforms for providing a host of application services. Included among the application services is the aforementioned transcription service, which may be carried out by the speech-recognition engine 540. The speech-recognition engine 540 may be distributed among or concentrated on one of the computing platforms of the application server 524.

Each of the computing platforms may include software or firmware operating on a processing system, such as a general purpose computing system, a specialized computing system, an open source, e.g., a Linux, computing system, a proprietary computing system, and the like. And each of processing systems may be configured for distributed or concentrated processing, and may be arranged in a peer-to-peer format, a client-server format or some combination thereof.

Although the application server 524 is shown separate from the PBX 522, the application server 524 may be part of the PBX 522. Thus, the speech-recognition engine 540 may be included in the PBX 522. In addition, the PBX 522 may act as a proxy for the speech-recognition engine 540. This allows the ST 510 to invoke the speech-recognition engine 540 without separately addressing the speech-recognition engine 540 and allows the speech-recognition engine 540 to send the text to the ST 510 without separately addressing the ST 510.

Figure 6:
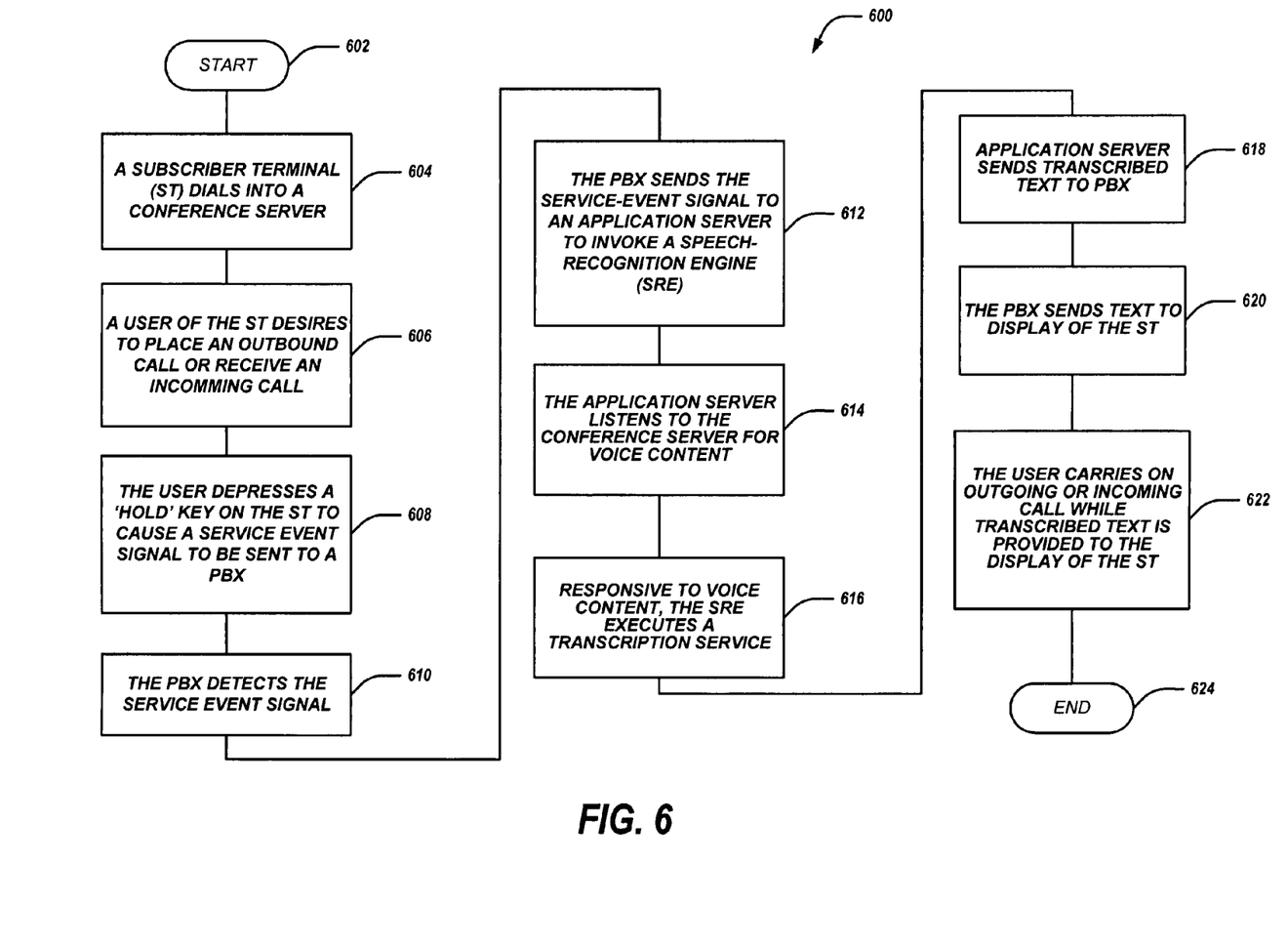
FIG. 6 is a second flow diagram illustrating a second flow for carrying out a transcription service that transcribes voice content of an on-going teleconference into text.

FIG. 6 is a flow diagram illustrating a flow 600 for carrying out a transcription service that transcribes, into text, voice content of an on-going teleconference between one subscriber terminal and another subscriber terminal. The flow 600 is described in reference to the system 500 of FIG. 5. In this embodiment, the speech-recognition engine 340 may be embodied as a speech-to-text conversion engine, the transcription service may be embodied as a speech-to-text conversion service, and ST 510 may be embodied as a terminal extension of the PBX 522. The flow 600 may also be carried out other systems, such as the systems 100, 300.

The flow 600 starts at start terminator 602. At block 604, the ST 510 dials into a conference server 520 via the PBX 522 to join a teleconference. The ST may also provide authentication information, e.g., a previously authorized passcode, to authenticate its authorization to join in the teleconference. Once authenticated, the ST 510 may receive from voice content from the conference server 520 over the first communication path.

Sometime during the teleconference, a user of the ST 510 desires to place an outbound call or answer an incoming call, as shown in block 606. To facilitate this, the user of the ST 510 depresses a key on the ST 510, such as the hold key, to place the teleconference on hold. This, in turn, causes the ST 510 to issue a service-event signal to the PBX 522 to place the teleconference on hold, and not let the ST 510 be dropped from the teleconference, as shown in block 508. At block 610, the PBX 522 detects the service-event signal and creates a service event to place the ST 510 on hold.

The PBX 522 sends the service-event signal over the fourth communication channel 516 to invoke the speech-recognition engine 540 on the application server 524, as shown in block 612. Thereafter, the application server 524 listens to the conference server 520 for voice content, as shown in block 614. When voice content is received on the conference server 520, it is forwarded to the application server 524 over the fourth communication channel 516 and on to the speech-recognition engine 540. After receipt of the voice content, the speech-recognition engine 540 executes the transcription service and transcribes the voice content into text, as shown in block 616.

At block 618, the speech-recognition engine 540 (via the application server 524) sends the text to the PBX 522 over the fourth communication channel 516. In turn, the PBX 522 sends the text to the display of the ST 510 over the first communication channel 514 at the appropriate delivery mode (e.g., real time, near real-time, or delayed in time), as shown in block 620. Thereafter, the user of the ST 510 may carry on the outbound or incoming call, while the transcription server provides text of the on-going teleconference of the display of the ST 510, as shown in block 622. At termination block 624, the flow 600 is terminated.

Figure 7:
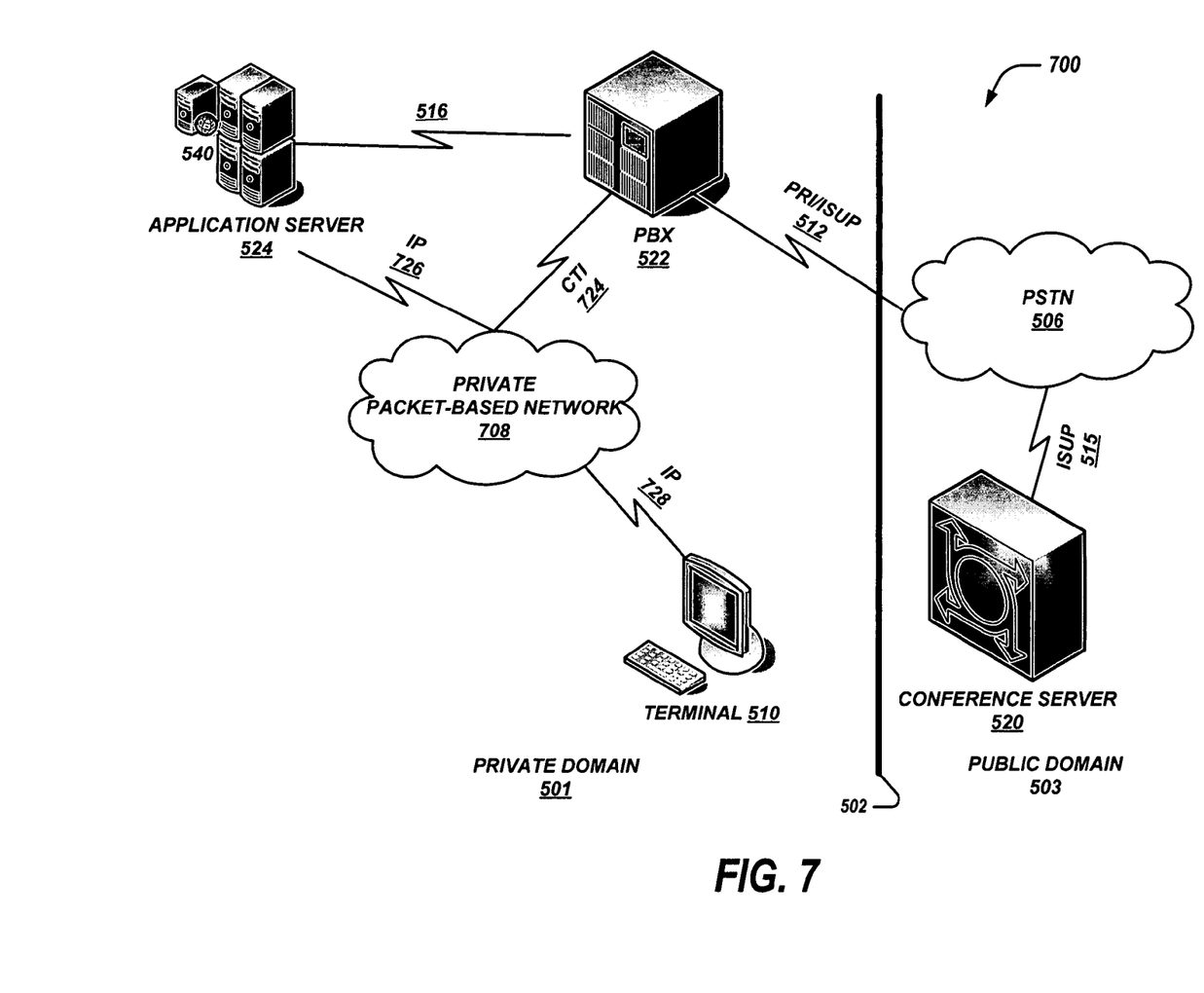
FIG. 7 is a fourth block diagram illustrating a second telecommunication system for serving a transcription service that transcribes voice content of an on-going teleconference into human-readable notation.

FIG. 7 is a block diagram illustrating a telecommunication system 700 for serving a transcription service that transcribes, into human-readable notation, voice content of an on-going teleconference between one subscriber terminal and another subscriber terminal. The system 700 of FIG. 7 is similar to the system 500 of FIG. 5, except as described herein.

Like the system 500, each of the private and public domains of the system 700, may include various internal interconnected network elements for carrying out the transcription service. In the private domain of this embodiment, the interconnected elements may include elements of a private packet-based network 508, such as an Ethernet protocol network (i.e., an IEEE 802.3 network) or an Internet Protocol (IP) network. The private domain may also include elements of a wireless wide area network (not shown), and/or a wireless local area network (WLAN), including a WLAN that operates in the radio frequency spectrum set aside for license-free, Industrial, Scientific and Medical (ISM) frequency band.

When combined, the various internal interconnected network elements of the private and public domains provide one or more segments of (i) a first communication path between the ST 510 and the conference server 520; (ii) a second communication path between the PBX 522 and the application server 524, and (iii) a third communication path between the application server 524 and a private packet-based network 508. Each of the first, second and third communication paths may include a number of communication channels for connecting one network element to another. For instance, as noted below, the first communication path for connecting the ST 510 with the conference server 520 may include the third and fourth communication channels 512, 515 along with fifth and sixth communication channels 728, 724.

As above, the private and public domains of system 500 may be deployed with other network elements not depicted in FIG. 7 for the sake of simplicity. Such other network elements may include switching devices, routing devices and service servers for serving services to the ST 510 and other terminals (not shown).

In this embodiment, the ST 510 may include packet-based network interface through which it can communicate voice and/or bearer content to the PBX 522 via the private packet-based network 508. Such communications may be carried over the fifth communication channel 728.

The fifth communication channel 728 is typically formatted according to the well-known IP standard. However, the fifth communication channel 728 may be formatted according to the Ethernet standard (i.e., IEEE 802.3), and/or any other packet-based protocol. Voice content exchanged over the fifth communication channel 728 may be formatted, for example, according a Voice-over-Packet-data protocol, such as Voice-over-Internet-Protocol (VoIP).

The system 700 provides for the sixth communication channel 724 between the private packet-based network 508 and the PBX 522 to complete the first communication path between the ST 510 and the conference server 520. This sixth communication channel 724 is typically formatted according to a standard or proprietary Computer Telephony Integration (CTI) protocol. Using the CTI protocol, the private packet-based network 508 may convert voice and bearer content received from the FST 510 for termination to the conference server 520. The private packet-based network 508 may then send the converted voice and bearer content to the PBX 522 over the sixth communication channel 724.

Conversely, the private packet-based network 508, using the CTI protocol, may convert voice and bearer content received from the PBX 522 for termination to the FST 510. After conversion the private packet-based network 508 may send this converted voice and bearer content to the FST 510 over the fifth communication channel 728.

The second communication path may include the fourth communication channel 516 over which voice content is sent from the PBX 522 to a speech-recognition engine 540 residing on the application server 524. The fourth communication channel 516 may be bidirectional, and thereby provide a path for sending the transcribed voice content from the speech-recognition engine 540 to the PBX 522. The fourth communication channel may be formatted according to a proprietary or standardized communication protocol, including any formats and/or protocols noted above.

Instead of routing the transcribed voice content back through the PBX 522, the sixth communication channel 724 and its corresponding conversion afforded by the CTI protocol, the third communication path of system 700 is provided. The third communication path of system 700 includes a seventh communication channel 726, which couples the application server 724 with the private packet-based network 508.

The seventh communication channel 726 is formatted according to the well-known IP standard. However, the seventh communication channel 726 may be formatted according to the Ethernet standard (i.e., IEEE 802.3), and/or any other packet-based protocol. This way, transcribed voice content may be forwarded to the ST 510 without the conversions required by the CTI protocol.

As such, the application server 524, like the ST 510, may include packet-based network interface through which it can communicate bearer content to the private packet-based network 508. In addition, the application server 524 may include a data store for housing a mapping between the extension number of ST 510 and its packet-based address so that the transcribed voice content may be forwarded to the ST 510 via the third communication path of the system 700.

As noted above, the ST 510 may be more than one device. Thus, in a system in which the systems 500 and 700 are combined, the ST 510 may be deployed as (i) an extension terminal of the PBX 522 for carrying on the on-going teleconference over the first communication path, and (ii) a computer for receiving the human-readable notation over the third communication path.

In another embodiment, the ST 510 may be again deployed as two devices. In this embodiment, however, only one of the devices may be used for carrying on the on-going teleconference (e.g. a desktop phone). However, both of the devices (e.g., the desktop phone and a computer) may receive the human-readable notation over the first and second communication paths and/or the third communication path.

Figure 8:
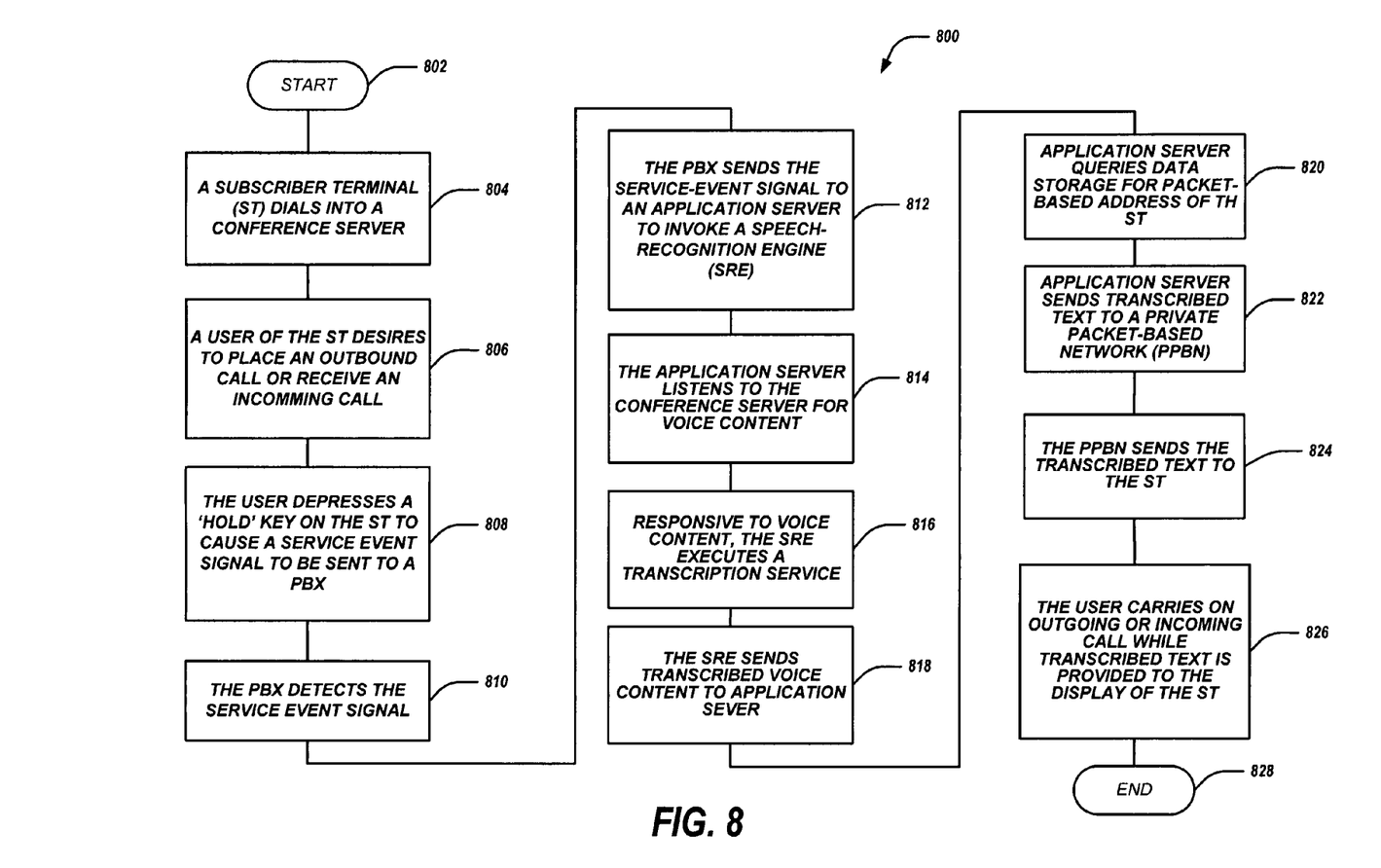
FIG. 8 is a third flow diagram illustrating a third flow for carrying out a transcription service that transcribes voice content of an on-going teleconference into text.

FIG. 8 is a flow diagram illustrating a flow 800 for carrying out a transcription service that transcribes, into text, voice content of an on-going teleconference between one subscriber terminal and another subscriber terminal. The flow 800 is described in reference to the system 700 of FIG. 7.

In this embodiment, like the flow 600 of FIG. 6, the speech-recognition engine 540 may be embodied as a speech-to-text conversion engine, and the transcription service may be embodied as a speech-to-text conversion service. Unlike the flow 600 of FIG. 6, the ST 510 may be embodied as a terminal extension of the PBX 522 that uses an IP protocol for communications. The flow 800 may also be carried out other systems, such as the systems 100, 300.

The flow 800 starts at a start terminator 802. To join a teleconference, the ST 510 establishes a connection with the conference server 520 by sending DTMF signals to the conference server 520 via the PBX 522 and the private packet-based network 508, as shown in block 804. The ST 510 may also provide authentication information, e.g., a previously authorized passcode, to authenticate their authorization to join in the teleconference. Once authenticated, the ST 510 may receive voice content from the conference server 520 over the fifth and sixth communication channels 528, 524.

Sometime during the teleconference, a user of the ST 510 desires to place an outbound call or answer an incoming call, as shown in block 806. To facilitate this, the user of the ST 510 depresses a key on the ST 510, such as the hold key, to place the teleconference on hold. This, in turn, causes the ST 510 to issue a service-event signal to the PBX 522 to place the teleconference on hold, and not let the ST 510 be dropped from the teleconference, as shown in block 808. This signal is carried through the private packet-based network 508 and the fifth and sixth communication channels 528, 524.

At block 810, the PBX 522 detects the service-event signal and creates a service event to place the ST 510 on hold. The PBX 522 then sends the service-event signal over the fourth communication channel 516 to invoke the speech-recognition engine 540 on the application server 524, as shown in block 812. Thereafter, the application server 540 listens to the conference server 520 for voice content, as shown in block 814.

When voice content is received on the conference server 520, it is forwarded to the application server 524 over the fourth communication channel 516 and on to the speech-recognition engine 540. After receipt of the voice content, the speech-recognition engine 540 executes the transcription service and transcribes the voice content into text, as shown in block 816.

At block 818, the speech-recognition engine 540 sends the text to the application server 524. The application server 524 then queries the data store to obtain the mapping between the extension number of ST 510 and its packet-based address, as shown in block 820. After obtaining the packet-based address of the ST 510, the application server 524 sends the text to the private packet-based network 508 over the seventh communication channel 726, as shown in block 822. The private packet-based network 508 then sends the text to the over the fifth communication channel 728 to the display of the ST 510, as shown in block 824.

Thereafter, the user of the ST 510 may carry on the outbound or incoming call, while the text is provided to the display of the ST 510, as shown in block 826. Blocks 816–824 may be carried out so as to deliver the text at an appropriate delivery mode. At termination block 828, the flow 800 is terminated.

CONCLUSION

In the foregoing detailed description, numerous specific details are set forth in order to provide a thorough understanding of exemplary embodiments described herein. However, it will be understood that these embodiments may be practiced without the specific details. In other instances, well-known methods, procedures, components, and structural entities have not been described in detail, so as not to obscure the foregoing description.

In view of the wide variety of embodiments to which the principles of the present invention can be applied, it should be understood that the illustrated embodiments are exemplary only, and should not be taken as limiting the scope of the present invention. In the embodiments described above, the nodes, terminal, devices, and systems may include computing systems, controllers, and other devices containing processors. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigured or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

Furthermore, the method steps described herein may be taken in sequences other than those described, and more or fewer elements may be used in the block diagrams. The embodiments disclosed are for exemplary purposes only and other embodiments may be employed in lieu of or in combination with of the embodiments disclosed. Further, the claims should not be read as limited to the described order or elements unless stated to that effect. Therefore, all embodiments that come within the scope and spirit of the following claims and equivalents thereto are claimed as the invention.

I claim:

1. A method for providing transcribed voice content in a human-readable format during an on-going teleconference, the method comprising:

a first terminal engaging in an on-going teleconference with at least one other terminal, wherein during the on-going teleconference the at least one other terminal is operable to communicate voice content;

the first terminal invoking a transcription service for transcribing the voice content into a human-readable notation;

the transcription service transcribing the voice content into the human-readable notation; and during the on-going teleconference, the first terminal receiving from the transcription service the human-readable notation and displaying the received human-readable notation.

2. The method of claim 1, wherein the step of the first terminal invoking a transcription service occurs during the on-going teleconference.

3. The method of claim 1, wherein the step of the transcription service transcribing the voice content into a human-readable notation comprises the transcription service converting the voice content into text.

4. The method of claim 3, wherein the step of displaying the received human-readable voice content comprises displaying the text.

5. The method of claim 1, wherein the transcription service is carried out by a speech-recognition engine.

6. The method of claim 1, wherein the first terminal comprises a processor and an application for carrying out the transcription service, and wherein the steps of (i) the first terminal invoking a transcription service, and (ii) the transcription service transcribing the voice content into a human-readable notation comprise the processor of the first terminal executing the application for carrying out the transcription service.

7. The method of claim 1, wherein the teleconference is carried out via a network comprising a network node, wherein network node comprises a processor and an application for carrying out the transcription service, and wherein the step of the first terminal invoking a transcription service comprises the first terminal sending an indication to the network node to execute the application for carrying out the transcription service.

8. The method of claim 7, wherein the step of the transcription service transcribing the voice content into a human-readable notation comprises the processor of the network node executing the application for carrying out the transcription service so as to provide to the network node with the human-readable notation.

9. The method of claim 8, wherein the step of the first terminal receiving from the transcription service the human-readable notation comprises the first terminal receiving the human-readable notation from the network node.

10. In a network comprising a first server for carrying out a teleconferencing service among a plurality of terminals, and a second server for carrying out a transcription service for transcribing voice content into a human-readable format, a method for providing transcribed voice content in a human-readable format during an on-going teleconference, the method comprising:

the first server serving a teleconferencing service between first and second terminals so as to allow the first and second terminals to engage in an on-going teleconference, the first server receiving from the second terminal voice content;

the second server receiving from the first terminal an indication to invoke a transcription service;

the second server invoking the transcription service;

responsive to invoking the transcription service, the second server obtaining the voice content from the first server;

the transcription service receiving the voice content from the first server;

the transcription service transcribing the voice content into the human-readable notation; and the second server sending the human-readable notation to the first terminal during the on-going teleconference to allow the first terminal to display the human-readable notation.

11. The method of claim 10, wherein the network comprises public domain and private domain networks, wherein the first server resides in the public domain network and the second server resides in the private-domain network.

12. The method of claim 10, further comprising the step of displaying the human-readable notation on the first terminal during the on-going teleconference.

13. The method of claim 10, wherein the transcription service is carried out by a speech-recognition engine; and wherein the step of the transcription service transcribing the voice content into a human-readable notation comprises the second server executing the speech-recognition engine so as to convert the voice content into text.

14. The method of claim 10, wherein the step of the second server receiving from the first terminal an indication to invoke a transcription service comprises the second server receiving from the first terminal a signal indicative of placing the on-going teleconference on hold.

15. A system for providing transcribed voice content in a human-readable format during an on-going teleconference, the system comprising:

a first server for carrying out a teleconferencing service between first and second terminals so as to allow the first and second terminals to engage in an on-going teleconference, wherein the first server is operable to receive from the second terminal voice content for termination to the first terminal; and a second server for carrying out, during the on-going teleconference, a transcription-service application for transcribing the voice content into a human-readable notation, and for providing the human-readable notation to the first terminal during the on-going teleconference in response to the first terminal requesting the second server carry out the transcription-service application.

16. The system of claim 15, wherein, to carry out the transcription-service application, the second server is operable to:

receive from the first terminal an indication to invoke the transcription-service application;

obtain the voice content from the first server; and transcribe the voice content into the human-readable notation so as to provide the first terminal with the human-readable notation.

17. The system of claim 16, wherein the transcription-service application comprises a speech-recognition engine.

18. The system of claim 15, wherein the first terminal comprises a display for displaying the human-readable notation received from the second server.

19. A transcription-service application for providing transcribed voice content in a human-readable format during an on-going teleconference between first and second terminals via a first server, wherein the first server is operable to receive from the second terminal voice content, and wherein the transcription-service application is disposed on a tangible media, the transcription-service application comprising a plurality of instructions executable by a processor to:

receive from a first terminal an indication to invoke the transcription-service application;

obtain the voice content from the first server;

transcribe the voice content into human-readable notation; and     provide the human-readable notation to the first terminal during the on-going teleconference, for display of the human-readable notation on the first terminal.

20. The system of claim 15, wherein the second server comprises a private branch exchange.

21. The system of claim 15, wherein the second server comprises a media gateway.

* * * * *